(12) United States Patent
Yang et al.

(10) Patent No.: US 7,362,355 B1
(45) Date of Patent: Apr. 22, 2008

(54) DIGITAL CMOS IMAGE SENSOR INCORPORATING A PROGRAMMABLE MULTI-FUNCTIONAL LOOKUP TABLE

(75) Inventors: David Xiao Dong Yang, Sunnyvale, CA (US); Michael Frank, Sunnyvale, CA (US); Odutola Oluseye Ewedemi, San Jose, CA (US); William R. Bidermann, Los Gatos, CA (US); Ricardo J. Motta, Palo Alto, CA (US); Justin Reyneri, Los Altos, CA (US); Hui Tian, Mountain View, CA (US)

(73) Assignee: PIXIM, Inc., Mountain View, CA (US)

( * ) Notice: Subject to any disclaimer, the term of this patent is extended or adjusted under 35 U.S.C. 154(b) by 1002 days.

(21) Appl. No.: 10/634,339

(22) Filed: Aug. 4, 2003

(51) Int. Cl.
*H04N 5/235* (2006.01)

(52) U.S. Cl. .................................. 348/222.1

(58) Field of Classification Search ............ 348/231.2, 348/231.3, 231.6, 231.99, 228.1, 222.1
See application file for complete search history.

(56) References Cited

U.S. PATENT DOCUMENTS

| | | | |
|---|---|---|---|
| 5,461,425 A * | 10/1995 | Fowler et al. ............... | 348/294 |
| 5,801,657 A * | 9/1998 | Fowler et al. ............... | 341/155 |
| 6,101,271 A * | 8/2000 | Yamashita et al. .......... | 382/167 |
| 6,919,924 B1 * | 7/2005 | Terashita ................. | 348/223.1 |
| 6,963,369 B1 * | 11/2005 | Olding ....................... | 348/241 |
| 6,975,355 B1 * | 12/2005 | Yang et al. ................. | 348/308 |
| 6,987,536 B2 * | 1/2006 | Olding et al. ............... | 348/297 |
| 7,034,872 B1 * | 4/2006 | Yamamoto .................. | 348/246 |
| 7,170,632 B1 * | 1/2007 | Kinjo ......................... | 358/1.9 |
| 7,209,168 B2 * | 4/2007 | Post ........................... | 348/246 |
| 2002/0140834 A1 * | 10/2002 | Olding et al. ............... | 348/294 |
| 2002/0140842 A1 * | 10/2002 | Olding et al. ............... | 348/362 |
| 2005/0069034 A1 * | 3/2005 | Dambrackas ........... | 375/240.01 |

OTHER PUBLICATIONS

U.S. Appl. No. 09/567,638.*
U.S. Appl. No. 10/185,584.*
U.S. Appl. No. 09/567,786.*
U.S. Appl. No. 09/567,638, filed May 9, 2000.*
U.S. Appl. No. 10/185,584, filed Jul. 1, 2002.*
U.S. Appl. No. 09/567,786, filed May 9, 2000.*

* cited by examiner

*Primary Examiner*—Tuan Ho
*Assistant Examiner*—Nicholas G Giles
(74) *Attorney, Agent, or Firm*—Patent Law Group LLP; Carmen C. Cook

(57) ABSTRACT

A system-on-chip imaging system includes an image sensor of a two-dimensional array of pixel elements providing pixel data representing an image of a scene, a data memory for storing pixel codewords whereby at least some of the pixel codewords are indicative of the pixel data, a programmable lookup table for providing LUT codewords as output data, and a processing unit for receiving LUT codewords from the lookup table and generating output image data. In operation, a first pixel codeword stored in the data memory is used to index the lookup table for causing the lookup table to provide a respective LUT codeword to the processing unit. The processing unit operates to perform one or more image processing functions in response to the LUT codeword. The lookup table can be programmed to perform a variety of image processing functions, including defective pixel correction, CDS subtraction, privacy masking and dark signal subtraction.

24 Claims, 4 Drawing Sheets

DIGITAL CMOS IMAGE SENSOR INCORPORATING A PROGRAMMABLE MULTI-FUNCTIONAL LOOKUP TABLE

FIELD OF THE INVENTION

The invention relates to image sensor systems and, in particular, to a digital image sensor including a multi-functional programmable lookup table for supporting image processing functions.

DESCRIPTION OF THE RELATED ART

Digital imaging devices, such as digital cameras, use an image sensor or a photosensitive device to sense the light intensity level of a scene. Conventional image sensors include charge coupled devices (CCD) and CMOS image sensors. CMOS image sensors are preferred over CCD image sensors in part because CMOS image sensors consume less power and are thus more suitable for portable applications. However, CMOS image sensors generally suffer from poor image quality because CMOS image sensors generally have a low dynamic range in image capability.

Conventional CMOS image sensors are capable of recording about 10 bits of a scene's dynamic range. That is, the image sensor can measure about 1024 different levels of light intensity values. Image capture and image processing methods for improving the dynamic range of CMOS image sensors have been applied to improve the quality of the captured image.

A CMOS image sensor with pixel level analog-to-digital conversion is described in U.S. Pat. No. 5,461,425 of B. Fowler et al. (the '425 patent). Such an image sensor, referred to as a digital pixel sensor (DPS), provides a digital output signal at each pixel element representing the light intensity detected by that pixel element. The combination of a photodetector and an analog-to-digital (A/D) converter in an area image sensor helps enhance detection accuracy, reduce power consumption, and improves overall system performance.

In the DPS array of the '425 patent, the analog-to-digital conversion (ADC) is based on first order sigma delta modulation. While this ADC approach requires fairly simple and robust circuits, it has the disadvantages of producing too much data and suffering from poor low light performance. U.S. Pat. No. 5,801,657 of B. Fowler et al. describes a Multi-Channel Bit Serial (MCBS) analog-to-digital conversion technique which can be advantageously applied in a digital pixel sensor for performing massively parallel analog-to-digital conversions. The MCBS ADC technique of the '657 patent can significantly improve the overall system performance while minimizing the size of the ADC circuit. Furthermore, as described in the '657 patent, an MCBS ADC has many advantages applicable to image acquisition and more importantly, facilitates high-speed readout. The aforementioned patents are incorporated herein by reference in their entireties.

Copending and commonly assigned U.S. patent application Ser. No. 09/567,638, entitled "Integrated Digital Pixel Sensor Having a Sensing Area and a Digital Memory Area" of David Yang et al., describes a DPS sensor integrated with an on-chip memory for storing at least one frame of pixel data. The incorporation of an on-chip memory in a DPS sensor alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is a technique capable of achieving a wide dynamic range in an image sensor without many of the disadvantages associated with other dynamic range enhancement techniques, such as degradation in signal-to-noise ratio and increased implementation complexity. Copending and commonly assigned U.S. patent application Ser. No. 09/567,786, entitled "Multiple Sampling via a Time-indexed Method to Achieve Wide Dynamic Ranges" of David Yang et al., describes a method for facilitating image multiple sampling using a time-indexed approach. The aforementioned patent applications are incorporated herein by reference in their entireties.

A typical (APS) CMOS image sensor includes an image sensor array for capturing incident light, analog-to-digital converters (ADC) for converting the sensed light intensity values into digital codes, and digital signal processing circuitry for processing the digital codes to generate an image with a desired level of quality. Typically, the digital signal processing circuitry is designed to implement multiple functions which are determined by the specific image sensor design. For example, the digital signal processing circuitry may include logic circuits for performing Gray Code conversions for compensating for ADC comparator meta-stability. The digital signal processing circuitry may include logic circuits for providing dead or defective pixel correction. For each desired image processing function, new logic circuitry or memory needs to be added or existing logic circuitry needs to be modified.

For instance, an image sensor may include circuitry for performing defective pixel correction. A defective pixel is sometimes referred to as a dead pixel. In that case, a memory is needed to store the coordinates of the defective pixels and logic circuits are incorporated to compare the coordinates of each pixel being processed to the list of defective pixel coordinates. If the coordinates for a particular pixel matches one of the defective pixel coordinates, the pixel is deemed defective and correction is performed.

In other cases, the pixels in an image sensor may have unusually high photo response non-uniformity (PRNU) which requires digital signal processing to correct. Alternately, gray code may be used to combat ADC comparator meta-stability. Other useful coding schemes may also be used depending on the applications.

In general, image processing functions are incorporated in an image sensor using the above-described ad-hoc approach. That is, each desired image processing function is provided for by dedicated logic circuitry and has to be designed-in during the design phase of the image sensor. To add more image processing functions or other sensor correction mechanisms in an image sensor, the image sensor typically needs to be re-designed, increasing the cost and the design lead time for the image sensor.

For example, conventional dead pixel correction techniques involve providing a dedicated memory or dedicated memory locations for storing the coordinates of defective pixels. Because a fixed amount of memory has to be pre-allocated, additional memory locations for storing more defective pixel locations cannot be readily provided without requiring substantial redesign of the image sensor.

Thus, in the design of an image sensor, there may be unforeseeable problems or unforeseen processing needs that cannot be accounted for during the design phase of the image sensor. When the problems are fixed or the additional image processing functions are added using the conventional ad-hoc approach, substantial re-design of the image sensor may be required, increasing the complexity of the design process and lengthening the design cycle-time. A solution to providing image processing features and functions in an image sensor without requiring repeated re-design of the sensor is desired.

SUMMARY OF THE INVENTION

According to one embodiment of the present invention, a system-on-chip imaging system includes an image sensor including a two-dimensional array of pixel elements where the image sensor provides pixel data representing an image of a scene, and a data memory, in communication with the image sensor, for storing pixel codewords. At least some of the pixel codewords are indicative of the pixel data. The system further includes a programmable lookup table, in communication with the data memory, for providing LUT codewords as output data, and a processing unit, in communication with the data memory and the lookup table, for receiving LUT codewords from the lookup table and generating output image data. In operation, a first pixel codeword stored in the data memory is used to index the lookup table for causing the lookup table to provide a respective LUT codeword to the processing unit. The processing unit operates to perform one or more image processing functions in response to the LUT codeword.

The lookup table can be programmed to perform a variety of image processing functions, including dead pixel correction, CDS subtraction, privacy masking and dark signal subtraction.

The present invention is better understood upon consideration of the detailed description below and the accompanying drawings.

DETAILED DESCRIPTION OF THE PREFERRED EMBODIMENTS

In accordance with the principles of the present invention, a system-on-chip (SOC) digital image sensor includes a multi-functional and programmable lookup table for supporting multiple image processing functions in the image sensor. Specifically, the lookup table operates integrally with a data memory and an image processing unit in the digital image sensor for interpreting the pixel codewords stored in the data memory and for directing the image processing unit to perform one or more image processing tasks based on the pixel codewords. The lookup table can be programmed by the image processing unit so that any desired image processing functions can be performed and can be incorporated in the digital image sensor. Exemplary image processing functions which can be programmed through the use of the lookup table include dead or defective pixel correction, dark signal subtraction, and privacy mask application. By enabling image processing functions to be programmed into the image sensor via the lookup table, the image sensor is provided with great flexibility in introducing processing functions as the need arises. Addition image processing functions can be added efficiently without requiring a complete re-design of the digital image sensor.

In one embodiment, the digital image sensor incorporates a DPS sensor array which performs pixel level analog-to-digital conversion of the pixel intensity values. In other embodiments, the digital image sensor is implemented using an active pixel sensor (APS) array or a charge coupled device (CCD) array where by the pixel data is digitized outside of the image sensor array.

In the present description, a digital pixel sensor (DPS) array or a sensor array refers to a digital image sensor having an array of photodetectors where each photodetector produces a digital output signal. In one embodiment of the present invention, the DPS array implements the digital pixel sensor architecture illustrated in FIG. 1 and described in the aforementioned '425 patent. The DPS array of the '425 patent utilizes pixel level analog-to-digital conversion to provide a digital output signal at each pixel. The pixels of a DPS array are sometimes referred to as a "sensor pixel" or a "sensor element" or a "digital pixel," which terms are used to indicate that each of the photodetectors of a DPS array includes an analog-to-digital conversion (ADC) circuit, and are distinguishable from a conventional photodetector which includes a photodetector and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

Figure 1:
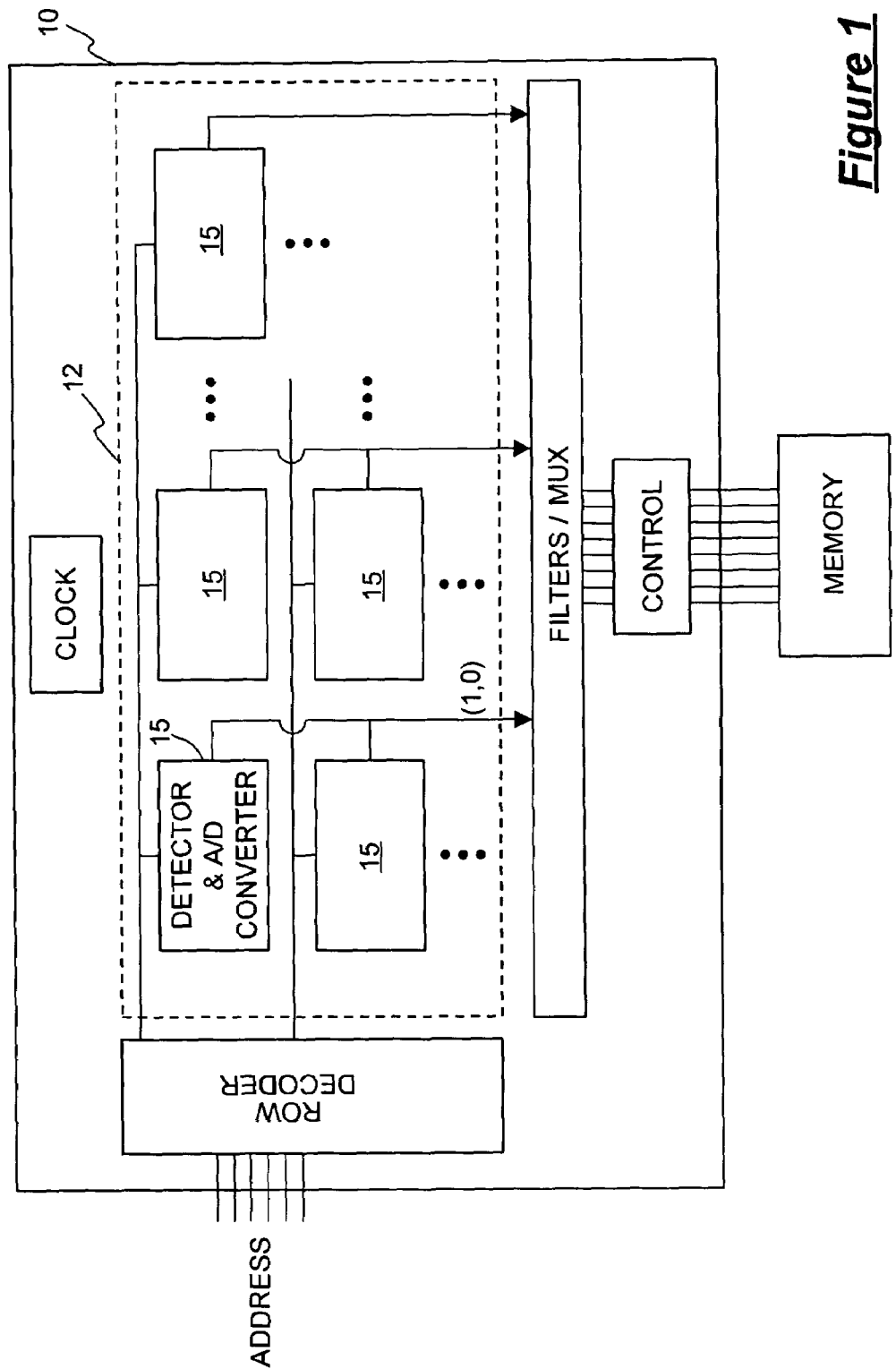
FIG. 1 is a block diagram of a digital image sensor as described in U.S. Pat. No. 5,461,425 of Fowler et al.

In the digital pixel sensor architecture shown in FIG. 1, a dedicated ADC scheme is used. That is, each of pixel elements 15 in sensor array 12 includes an ADC circuit. The image sensor of the present invention can employ other DPS architectures, including a shared ADC scheme. In the shared ADC scheme, instead of providing a dedicated ADC circuit to each photodetector in a sensor array, an ADC circuit is shared among a group of neighboring photodetectors. For example, in one embodiment, four neighboring photodetectors may share one ADC circuit situated in the center of the four photodetectors. The ADC circuit performs A/D conversion of the output voltage signal from each photodetector by multiplexing between the four photodetectors. The shared ADC architecture retains all the benefits of pixel level analog-to-digital conversion while providing the advantages of using a much smaller circuit area, thus reducing manufacturing cost and improving yield.

Figure 2:
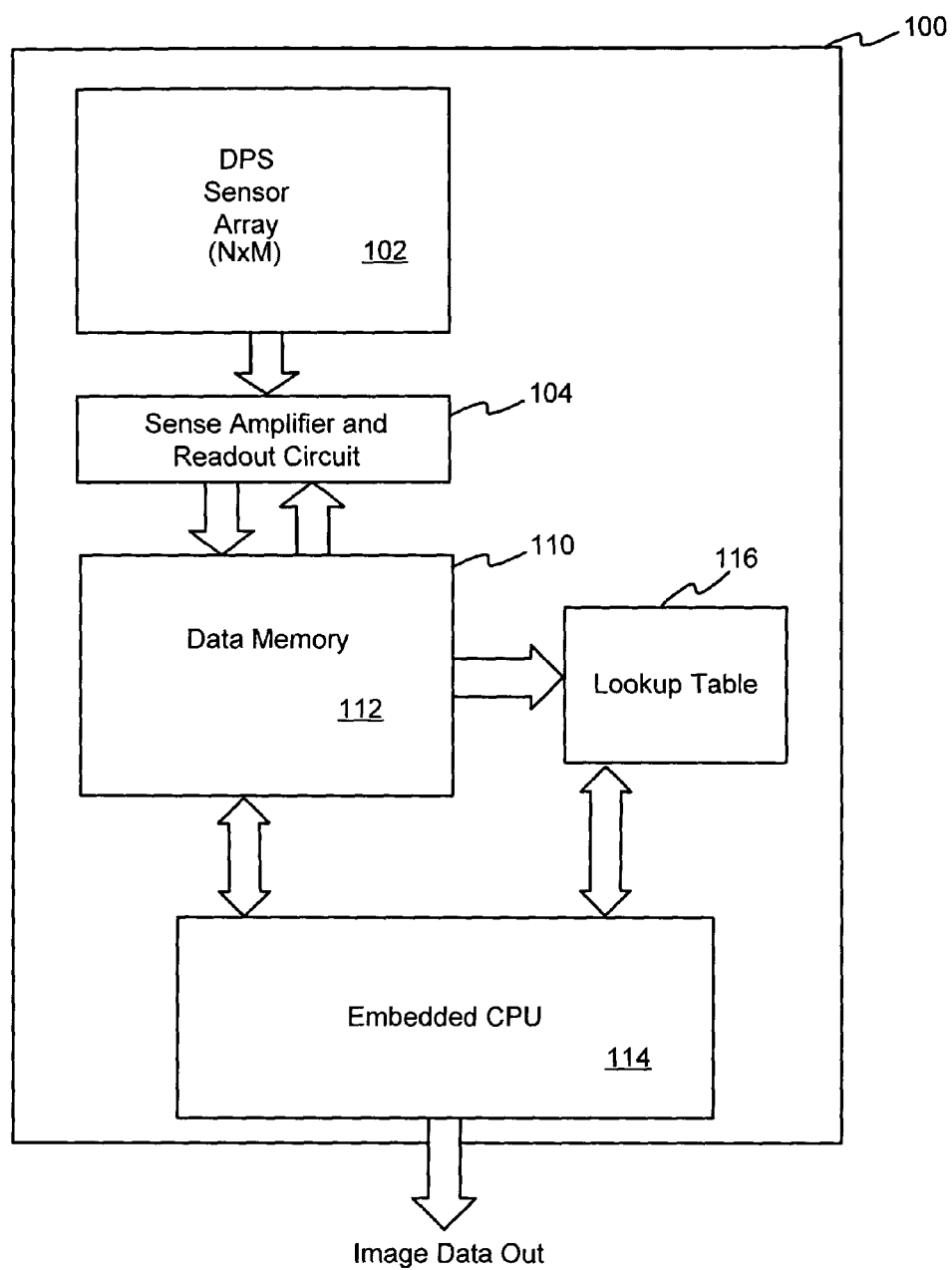
FIG. 2 is a functional block diagram of a SOC digital image sensor 100 according to one embodiment of the present invention.

FIG. 2 is a functional block diagram of a SOC digital image sensor 100 according to one embodiment of the present invention. Referring to FIG. 2, image sensor 100 includes a DPS sensor array 102 which operates to generate at each pixel location digital data as an output signal. In the present embodiment, DPS sensor array 102 includes an N×M array of pixel elements. Image sensor 100 may further include support circuitry to facilitate the read out of digital data from sensor array 102. In FIG. 2, image sensor 100 includes a sense amplifier and readout circuit 104 coupled to sensor array 102 to receive the digital data from the sensor array and facilitate the storage of the digital data into corresponding memory locations in a data memory 112. Image sensor 100 may include other circuitry such as a row and column address decoders and other control circuits (not shown in FIG. 2). In the present embodiment, data memory 112 is an integrated on-chip memory for storing at least one frame of image data from sensor array 102. Thus, data memory 112 has the capacity to store pixel data for at least N by M pixels in k bits. In one embodiment, sensor array 102 is a 732×548 pixel array generating pixel data in 12 bits.

As a system-on-chip image sensor, digital image sensor 100 further includes a programmable, multi-functional lookup table 116 and an embedded processor 114. Image sensor 100 may further include other dedicated datapath or logic circuitry not shown in FIG. 2. Lookup table 116 includes multiple number of table entries where each table entry is programmed with a codeword, hereinafter a "LUT codeword," for directing processor 114 to perform a predefined image processing function. Lookup table 116 is indexed by the pixel data in data memory 112. In the present embodiment, lookup table 116 is a full lookup table including $2^k$ entries where k is the number of bits in which the pixel data is expressed in data memory 112. Thus, the full k-bit of pixel data is used to index lookup table 116. When the pixel data is stored in 12 bits, lookup table 116 includes $2^{12}$ or 4096 entries. In other embodiments, lookup table 116 can be indexed by t bits of the pixel data where t is less than k. In such cases, lookup table 116 includes $2^t$ number of table entries. Lookup table 116 can be implemented as a DRAM memory or a SRAM memory. Alternately, lookup table 116 can be implemented as a ROM memory, such as EEPROM and flash memory.

Lookup table 116 provides the interpretation of the pixel data stored in data memory 112. As will be described in more detail below, the pixel data can represent pixel intensity values or the pixel data can be a specially assigned "pixel codeword." The pixel data or the pixel codeword is used to index lookup table 116. Lookup table 116 provides output data in the form of LUT codewords having any number of bits depending on the application. For example, lookup table 116 can output LUT codewords in 10 bits.

In accordance with the present invention, the content of lookup table 116 can be updated dynamically by processor 114. Thus, lookup table 116 is fully programmable and any desired image processing functions can be programmed into the lookup table at any time. That is, lookup table 116 can be programmed even after manufacturing of the image sensor integrated circuit. For instance, new image processing functions can be added to image sensor 100 at any time to either repair defects in the image sensor or to enhance the operation of the image sensor. Thus, lookup table 116 provides flexibility and enhances the functionality of image sensor 100.

Processor 114 performs image processing functions in accordance with the LUT codewords provided by lookup table 116. Each LUT codeword can indicate a specific processing function or a multiple number of processing functions. Processor 114 also operates to update the codewords in lookup table 116 as needed to introduce new image processing functions. In this manner, pixel data or pixel codewords stored in data memory 112 are processed in accordance with the desired image processing functions before being read out of the digital image sensor as image data which image data can be used for displaying the captured image or for use in numerous imaging applications.

In a conventional image sensor, the data memory stores pixel data that are indicative of the pixel intensity values detected by the pixel elements in the sensor array. The pixel data is stored as binary values or can be encoded, such as encoding the pixel data in Gray code for minimizing noise errors. Thus, when the pixel data is expressed in k bits, the full scale pixel intensity value, also referred to as the dynamic range, of the pixel elements is represented by $2^k$ levels of light intensity values. For example, when the pixel data is expressed in 12 bits, 4096 levels of light intensity values are captured and stored.

However, in accordance with one embodiment of the present invention, the pixel data are stored in the form of "pixel codewords" which codewords are to be interpreted by lookup table 116. In one embodiment, the full scale pixel intensity value is expressed in less than $2^k$ levels. The remaining pixel intensity values not used for encoding pixel intensity values are used as specially assigned pixel codewords representing specific image processing functions. For example, when the pixel codeword is expressed in 12 bits, the first 3096 codewords can be used to represent the full dynamic range of the sensor array while the remaining 1000 codewords can be used as codes for indicating certain image processing functions. When the pixel codewords are used to index lookup table 116, the corresponding entries in lookup table 116 contains LUT codewords which either recognizes the pixel codewords as pixel intensity values or as instructions to processor 114 for invoking certain predefined image processing function. In another embodiment, the k-bit pixel codeword is partitioned and the lower s bits are used for storing pixel intensity values while the upper k-s bits are used to store codewords for use to index lookup table 116 for invoking predefined image processing functions.

Examples of image processing functions that can be encoded in the pixel codewords include defective or dead pixel indication, use of a specific interpolation routine. When desired, the pixel codewords can be used to differentiate between different types of defective pixels. One of the main advantages of storing pixel data in codewords and incorporating a programmable lookup table in image sensor 100 is the ability to introduce any desired processing function to image sensor 100 at any time. This is particularly important as it is impossible to anticipate and provide for all the image processing functions that an image sensor may need during the design phase. By incorporating a programmable lookup table in the image sensor, the image sensor can be programmed with any desired image processing functions when needed. For instance, filtering or tone correction or other image enhancement functions can be added after the manufacturing of the image sensor. Also, the LUT codewords can change depending on the usage condition the image sensor is subjected to. For example, in low light conditions, a first set of LUT codewords are used while in bright light conditions, a second set of LUT codewords are used.

Another key advantage provided by the use of a programmable lookup table in the image sensor is that a large number of image processing functions can be programmed without requiring a large amount of logic circuitry. Typically, when individual image processing functions are to be provided for using logic circuitry, a large amount of silicon area is required to implement the logic circuitry, thereby increasing the size and the cost of manufacturing the image sensor. Furthermore, when each image processing function has to be provided for using separate logic circuitry, new image processing function often cannot be added without substantial redesign of the image sensor integrated circuit.

Processor 114 can be implemented as any processing unit such as a microprocessor or a microcoded computing engine. Processor 114 stores preprogrammed image processing algorithms which can be invoked by the LUT codewords provided by lookup table 116. Processor 114 may include a non-volatile memory for storing programming data or the image processing algorithm. For instance, an EPROM, EEPROM or a flash memory may be used to store the programming data. Based on the LUT codeword, the processor can retrieve and run the prestored image processing algorithm to generate the desired image data. Processor 114 can further include a table generator for generating the LUT codewords to be stored in lookup table 116.

Figure 3:
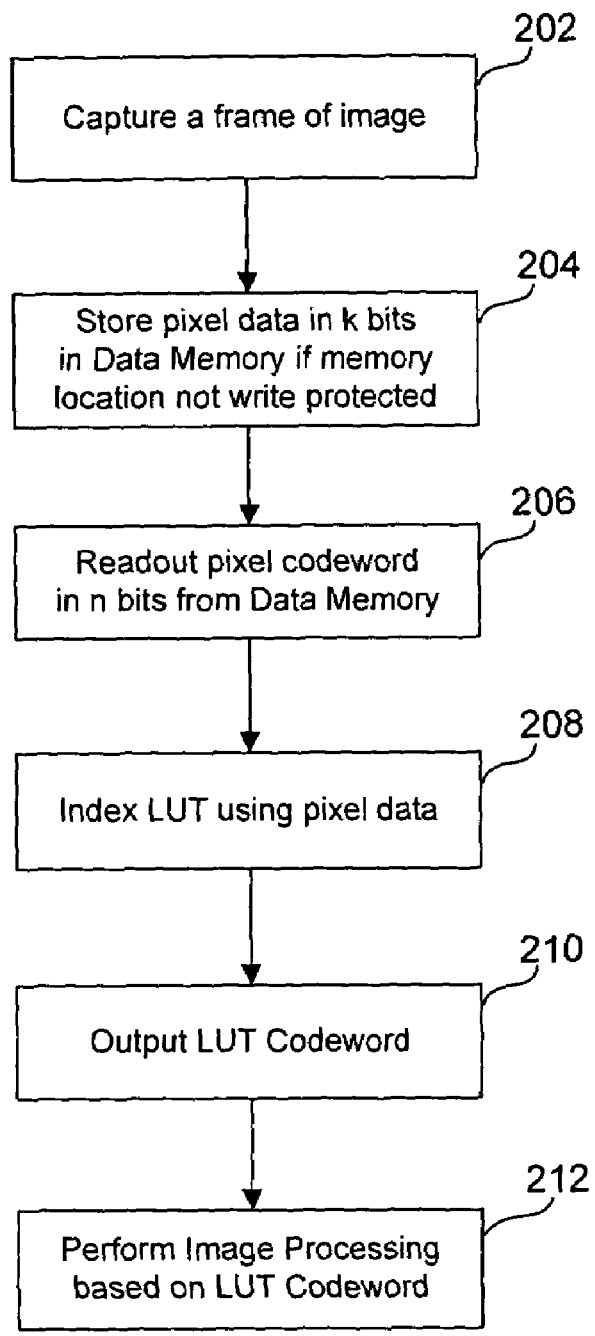
FIG. 3 is a flow chart illustrating the pixel data processing method according to one embodiment of the present invention.

FIG. 3 is a flow chart illustrating the pixel data processing method according to one embodiment of the present invention. Referring to FIG. 3, at step 202, sensor array 102 is activated to capture a frame of image. The pixel intensity values recorded by sensor array 101 have to be read out and stored in data memory 112. However, in accordance with the present invention, some of the pixel locations in data memory 112 may be write-protected because pixel codewords stored therein that are used to indicate specific image processing functions (such as dead pixel indication) should not be overwritten. Thus, at step 204, pixel data from sensor array 102 is stored in data memory 112 only if the pixel locations are not write-protected. Readout circuit 104 operates to determine which pixel locations are write-protected in data memory 112.

To generate the image data for the frame just captured, the pixel codewords stored in data memory 112 are read out (step 206) and used to index lookup table 116 (step 208). Lookup table 116 output LUT codewords based on the pixel codewords (step 210) and provides the LUT codewords to processor 114 for processing. processor 114 performs image processing functions based on the LUT codewords and provides image data as output.

The flow chart in FIG. 3 is illustrative only and is provided as one exemplary embodiment of the pixel data processing method that can be operated in image sensor 100. One of ordinary skill in the art would appreciate that variations in the data processing method can be applied without deviating from the spirit of the present invention.

As described above, the lookup table of the present invention can be programmed to provide a variety of image processing functions. The following is descriptions of several image processing functions which can be programmed into a digital image sensor using a lookup table in accordance with the present invention. The following descriptions are provided as illustrations only and are not intended to be limiting. One of ordinary skill in the art, upon being apprised of the present disclosure, would appreciate that other image processing functions can be programmed into a digital image sensor using the lookup table in accordance with the present invention.

1. Correlated Double Sampling (CDS)

Correlated double sampling is an image processing technique employed to reduce kT/C or thermal noise and 1/f noise in an image sensor array. CDS can also be employed to compensate for any fixed pattern noise or variable comparator offset. To implement CDS, the sensor array is reset and the pixel value at each photodetector is measured and stored in specified memory locations in the data memory. Subsequently, for each frame of pixel data captured by the sensor array, the stored CDS values are subtracted from the measured pixel intensity values to provide normalized pixel data free of errors caused by noise and offset.

In accordance with one embodiment of the present invention, image sensor 100 implements CDS and the CDS values for each pixel location are stored in data memory 112. Specifically, the k-bit pixel data is partitioned and part of the k-bit is used for measured pixel intensity values and the remaining part used for CDS values. In a typical CDS implementation, a dedicated number of bits are allotted for storing the CDS values and the number of bits cannot change after an image sensor is designed. However, in image sensor 100 of the present invention, the number of bits that is allocated for CDS values can be varied by programming lookup table 116. For example, when memory for storing pixel data in 12 bits is provided in image sensor 100, 4 bits can be used for CDS values and the remaining 8 bits can be used to store pixel intensity values. Alternately, lookup table 116 can be reprogrammed to use only 3 bits for CDS values and the remaining 9 bits for pixel intensity values.

The ability to vary the number of bits for storing CDS values in image sensor 100 provides particular advantages. Specifically, the number of bits for CDS values can vary depending on the lighting conditions so that more or fewer bits can be used to store the pixel intensity values. For example, in low light conditions, CDS subtraction becomes more important. So more bits can be assigned to store CDS values. However, in bright light conditions, CDS values become less important. Thus, fewer bits can be assigned to represent the CDS values so that more of the remaining bits can be assigned to store the pixel intensity values or pixel codewords.

Furthermore, in accordance with another embodiment of the present invention, image sensor 100 implements CDS and an n number of bits within the k-bit pixel data is assigned for storing CDS values where n can be varied by programming lookup table 116. However, only part of the remaining k−n bits is used for storing actual pixel intensity values. A portion of the k−n bits is used for storing pixel codewords such as for dead pixel indication or for invocation of particular data interpolation routine. For example, in one embodiment, 4 out of 12 bits of pixel data are used to store CDS values. The remaining 8 bits provide 256 pixel codewords of which only 240 pixel codewords are used for representing the full range pixel intensity values. The remaining 16 codewords are used for dead pixel indication or for other image processing functions.

As described above, by incorporating a programmable, multi-functional lookup table in image sensor 100, the implementation of CDS in image sensor 100 is made more flexible.

2. A/D Conversion Schemes

As described above, Multi-Channel Bit Serial (MCBS) is an analog-to-digital conversion technique that is well suited for use in a DPS sensor array. When MCBS A/D conversion is used, the analog signals are digitized into k-bit codewords where the k bits are output from the sensor array in a bitplane format. Another A/D conversion technique that is suited for use in a DPS sensor array is the thermometer-code analog-to-digital conversion technique with continuous sampling of the input signal.

Thermometer-code analog-to-digital conversion is capable of achieving a digital conversion with a very high dynamic range. A massively parallel thermometer-code analog-to-digital conversion scheme is described in copending and commonly assigned U.S. patent application Ser. No. 10/185,584, entitled "Digital Image Capture having an Ultra-high Dynamic Range," of Justin Reyneri et al., filed Jun. 26, 2002, which patent application is incorporated herein by reference in its entirety. When thermometer code ADC is used, the sensor array provides output data in $2^N$ bitplanes.

Furthermore, as described above, image sensor 100 can implement multiple sampling (also referred to as multi-capture) for improving the dynamic range of the captured image. When multiple sampling is applied, the MCBS and Thermometer Code conversion schemes generate different data format to represent pixel data captured at different exposure times.

In a conventional digital image sensor, the image sensor has to be designed for a specific analog-to-digital conversion scheme. However, the different ADC schemes are useful for different imaging conditions and thus the image sensor cannot be optimized for different types of usage. Also, the use and selection of a multi-capture scheme and a single capture scheme in an image sensor requires specific logic circuitry to be provided to handle the output data from the sensor array.

However, in accordance with one embodiment of the present invention, image sensor 100 can be programmed to implement any analog-to-digital conversion scheme or any single or multi-capture scheme without requiring change in hardware. Basically, processor 114 and lookup table 116 are programmed to perform a particular analog-to-digital conversion scheme and data memory 112 stores the output data from sensor array regardless of the format. The pixel data stored in data memory 112 are interpreted by lookup table 116 to provide the corresponding image data output. In this manner, lookup table 116 enables the implementation of a variety of analog-to-digital conversion schemes and enables the ready selection between a single capture or a multi-capture imaging scheme.

3. Dead Pixel Correction Scheme

A sensor array typically includes defective or "dead" pixels which are pixels that do not display the expected optical and electrical characteristics. Dead pixels include "dark" pixels, "white" pixels and stuck-at pixel. Dead pixels can also include pixels whose photo response differs significantly from the neighboring pixels. In an image sensor, a dead pixel correction scheme is typically included to detect the dead pixel and apply correction of the missing or incorrect pixel value.

Conventional dead pixel correction schemes typically involve providing a memory to store the coordinates or addresses of the dead pixels. When the pixel data are retrieved from the data memory, the address of the pixel being processed has to be compared with the stored addresses of the dead pixels. Thus, a large circuit overhead is needed to support the address comparison and related operations. Moreover, because memory locations for the dead pixels have to be allocated during design, only a predetermined number of dead pixel locations can be stored. If an image sensor has dead pixel locations exceeding the maximum number of allocated locations, the image sensor has to be rejected as defective. On the other hand, it is impractical to provide a large memory just for storing dead pixel locations as including more memories increases the size and the cost of the image sensor.

In the image sensor of the present invention, the programmable, multi-functional lookup table provides an effective and efficient way of handling dead pixel correction. According to one embodiment of the present invention, a pixel codeword is reserved to indicate a dead pixel. For example, when the pixel data is expressed in 8-bit, 28 pixel codewords are available but only part of the 28 pixel codewords is used to represent pixel intensity values. Instead, one of the codeword, such as "11111111", is reserved for indicating a pixel is a dead pixel. When dead pixels in a sensor array have been identified, such as during manufacturing testing, the reserved codeword is stored in the data memory location associated with the dead pixels. When the pixel data (or pixel codewords) are retrieved from the data memory, the reserved codeword will index the lookup table for providing a LUT codeword indicative of a dead pixel as output value. The LUT codeword indicative of a dead pixel is provide to the processor for processing. The processor, in response, will determine a pixel value for the dead pixel, such as by interpolating from the neighboring pixel values.

In order to practice the dead pixel correction method of the present invention, measures have to be taken to ensure that the reserved codewords stored in the data memory at the dead pixel locations are not overwritten during sensor readout. Referring to FIG. 2, a digital interface (not shown) is provided between readout circuit 104 and data memory 112. The digital interface implements a read-modified-write operation. When pixel data is read out from sensor array 102, the digital interface first read the value of the pixel codeword stored in data memory 112. If the value is a reserved codeword, such as a reserved codeword for a dead pixel, then the digital interface will prevent the new pixel data from being written into the data memory. If the value is not a reserved codeword, the new data can be written into data memory 112. In this manner, dead pixel reserved codewords that are written into data memory 112 will not be overwritten and the dead pixel locations are preserved.

The dead pixel correction method using the lookup table of the present invention provides many advantages over the conventional dead pixel correction methods. First, there is no need to set aside additional memory for storing addresses of dead pixels. Thus, there is no limit to the number of defective pixel locations that can be stored. The dead pixel indicators are stored in the same memory locations that are assigned to the defective pixels already. Therefore, any number of defective pixels can be identified. Defective pixel correction can be provided using existing memory and does not require additional memory. Second, the pixel correction method of the present invention permits the handling of different types of dead pixels. For instance, a reserved codeword can be assigned for each type of dead pixels so that the desired interpolation scheme can be invoked for that type of dead pixel. Because of the programmable nature of the lookup table used to implement dead pixel correction, the dead pixel correction method of the present invention can be flexibly applied to provide any type of interpolation scheme as needed.

4. Privacy Masks

In imaging applications, a privacy mask is sometimes applied to block out certain regions of a scene to be imaged, such as for privacy protection. For example, a security camera could be installed in public restrooms. However, certain regions of the scene imaged should be masked for privacy concerns. One method to implement privacy masks is to treat the region to be masked as dead pixels. That is, the address locations for the region to be masked are stored and those address locations are compared with the pixel data upon readout to determine if the pixel data should be processed.

In accordance with one embodiment of the present invention, privacy masks are implemented in a digital image sensor using a programmable, multi-function lookup table. Specifically, the privacy masks are implemented in the same manner as the dead pixel correction method described above. However, a reserved codeword, different than the dead pixel reserved codeword, is used to indicate a masked pixel. In this manner, when the privacy mask reserved codeword is used to index the lookup table, the lookup table provides a LUT codeword indicating to the processor that the specific pixel location is masked. The processor can then invoke the preprogrammed algorithm for a masked pixel, such as by providing a black-out image as output data.

Furthermore, in accordance with the present invention, a digital interface as described above can be included in the image sensor to prevent the privacy mask reserved codewords from being overwritten.

5. Dark Signal Subtraction

Dark signals in a digital image sensor may contribute to significant degradation of the image quality, especially under low light or high temperature conditions. Often, it is necessary to subtract out the dark signals to minimize the degradation. However, depending on the operating conditions, different types of image processing algorithms, such as linear or nonlinear subtraction, could be used to subtract out the dark signals. In accordance with the present invention, the programmable lookup table can be used to apply different types of image processing algorithms. Specifically, the processor can program the lookup table with different sets of LUT codewords identifying different image processing algorithms. In this manner, effective dark signal subtraction can be implemented in a digital image sensor without requiring a large amount of logic circuitry. Furthermore, new image processing algorithms can be added to the image sensor after the design of the image sensor by programming the processor and the lookup table.

The above description provides examples of the types of image processing functions that can be programmed into an image sensor using the lookup table of the present invention. Other image processing functions can also be provided. Furthermore, the lookup table can be programmed to provide multiple image processing functions at the same time. That is, an image sensor can be programmed to perform dead pixel correction, privacy masks and multiple A/D conversion schemes at the same time. There is no limit to the types and number of image processing functions that can be implemented using the lookup table of the present invention.

Image sensor 100 of FIG. 2 illustrates a SOC image sensor incorporating one lookup table. In other embodiments, multiple lookup tables may be used depending on the architecture of the SOC image sensor. Furthermore, a SOC image sensor may include a first partial lookup table for performing a first set of image processing functions and a second partial lookup table for performing a second set of image processing functions.

Figure 4:
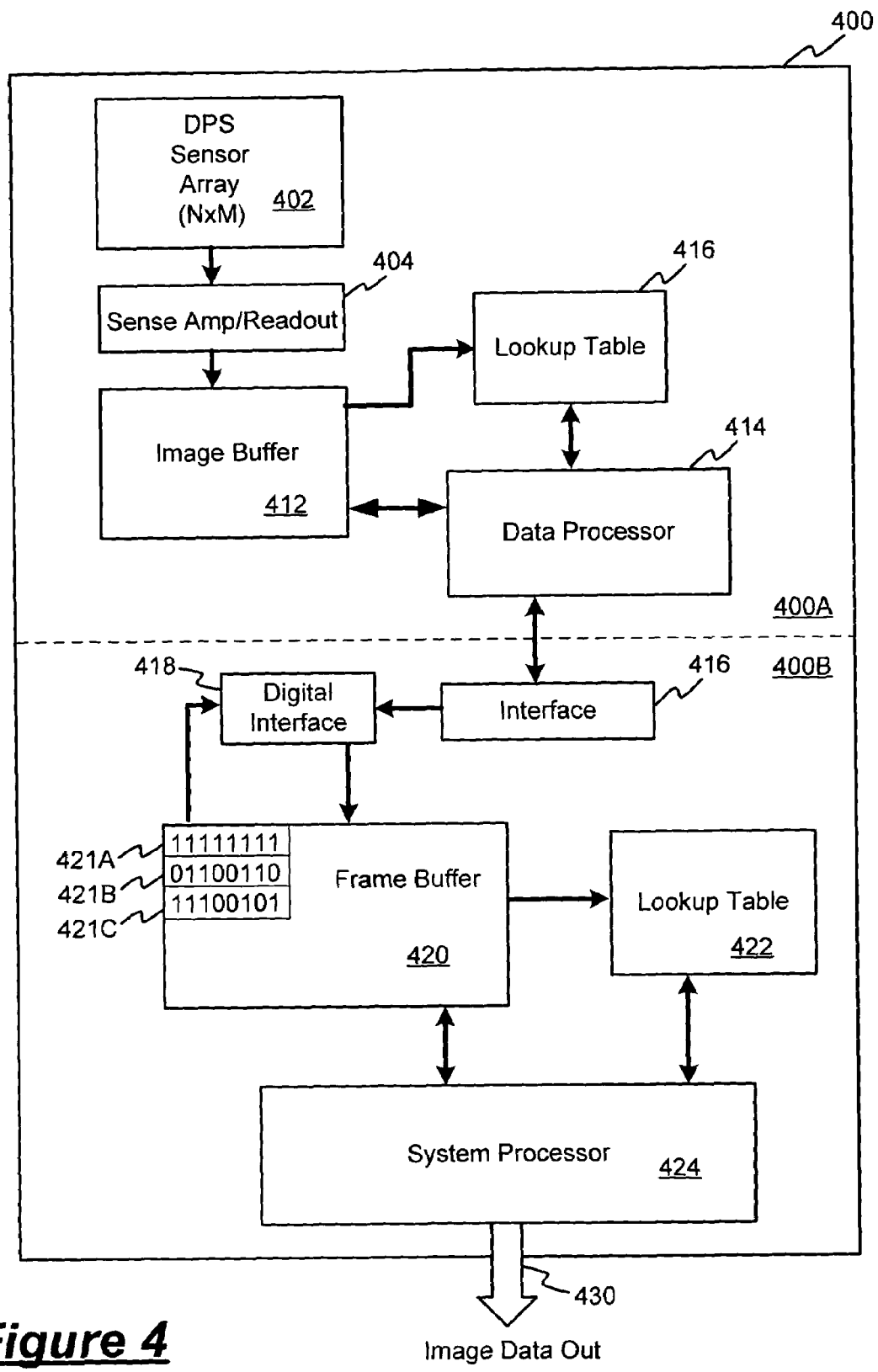
FIG. 4 a functional block diagram of a SOC digital image sensor according to an alternate embodiment of the present invention.

FIG. 4 a functional block diagram of an SOC digital image sensor according to an alternate embodiment of the present invention. Referring to FIG. 4, an SOC image sensor 400 includes a DPS sensor array 402 for capturing an image of a scene and a sense amplifier and readout circuit 404 for reading out the pixel intensity values from sensor array 402. In the present embodiment, image sensor 400 includes two data memories. Image sensor 400 includes an image buffer 412 for storing the pixel data from sensor array 402. Preliminary processing of pixel data stored in image buffer 412 is provided by data processor 414. Image sensor 400 further includes a frame buffer 420 for storing the processed pixel data from data processor 414. The pixel data stored in frame buffer 410 are subjected to further processing by a system processor 424.

The configuration of image sensor 400 in FIG. 4 has particular application in video imaging applications where sensor array 402 is used to capture motion video images and system processor 424 provides motion video output. In the present embodiment, image sensor 400 can be manufactured on two separate integrated circuits 400A and 400B. An interface circuit 416 is provided to receive data from data processor 414 of the first integrated circuit 400A and provide the data to the frame buffer of the second integrated circuit 400B.

Image sensor 400 includes two programmable, multifunctional lookup tables 416 and 422 for providing image processing functions to the image sensor at different stages of pixel data processing. In one embodiment, sensor array 402 implements MCBS analog-to-digital conversion and pixel data in Gray code is read out from the sensor array and stored in image buffer 412 in a bitplane format. That is, a first bit of each pixel is stored followed by the second bit of each pixel. Furthermore, CDS is applied in image sensor 400 so that part of image buffer 412 stores the CDS subtract values for the pixels. In the present embodiment, lookup table 416, operating in conjunction with data processor 414, provides CDS subtract function and Gray code to binary conversion.

The CDS corrected and linear pixel data is read by interface circuit 416. In the present embodiment, dead pixel correction or privacy masks functions are provided using lookup table 422 and associated with frame buffer 420. That is, reserved codewords for dead pixels or for masked pixels are stored in their respective locations in frame buffer 420. For example, in FIG. 4, memory location 421A stores a dead pixel reserved codeword while memory location 421C stores a masked pixel reserved codeword. A digital interface 418 is provided to act as a write mask for protecting memory locations storing reserved codewords.

In operation, interface circuit 416 receives linearized pixel data from data processor 414. For each pixel location, digital interface 418 reads the stored content from frame buffer 420. Digital interface 418 determines whether the pixel location is write protected, that is, whether the stored content is a reserved codeword. If so, the pixel data from interface circuit 416 is not stored. If not, the pixel data is stored at the respective pixel location. In this manner, pixel data from sensor array 402 is stored in frame buffer 420 without overwriting reserved codewords stored for indicating dead pixels or masked pixels.

When pixel data are read out of frame buffer 420, the pixel data is used to index lookup table 422 which lookup table can be programmed to provide a variety of image processing functions. For example, lookup table 422 can be programmed by system processor 424 to perform dark signal subtraction. System processor 424 operates on the LUT codewords provided by lookup table 422 and provides the desired image data as output.

The above detailed descriptions are provided to illustrate specific embodiments of the present invention and are not intended to be limiting. Numerous modifications and variations within the scope of the present invention are possible. The present invention is defined by the appended claims.

We claim:

1. A system-on-chip imaging system, comprising:
an image sensor comprising a two-dimensional array of pixel elements, said image sensor providing pixel data representing an image of a scene;
a data memory, in communication with said image sensor, for storing pixel codewords, some of said pixel codewords being indicative of said pixel data and some of said pixel codewords having assigned values representing one or more image processing functions;
a programmable lookup table, in communication with said data memory, for providing LUT codewords as output data, said programmable lookup table including a plurality of entries, each entry storing a LUT codeword and each entry being indexed by a respective pixel codeword to provide said stored LUT codeword as said output data; and
a processing unit, in communication with said data memory and said lookup table, for receiving LUT codewords from said lookup table and generating output image data and for updating said entries of said programmable lookup table to program one or more image processing functions in said programmable lookup table, wherein a first pixel codeword stored in said data memory is used to index said lookup table for causing said lookup table to provide a respective LUT codeword to said processing unit said LUT codeword being indicative of pixel intensity value represented by said first pixel codeword or as an instruction to invoke one or more image processing functions, and said processing unit operates to perform one or more image processing functions in response to said LUT codeword.

2. The system of claim 1, wherein said pixel codewords are expressed in k bits and said lookup table comprises $2^k$ entries.

3. The system of claim 1, wherein said data memory provides k bits for each pixel location, a first portion of said k bits being used to store CDS subtract values for each pixel location and a second portion of said k bits being used to store a pixel codeword for the respective pixel location.

4. The system of claim 3, wherein said processing unit programs said lookup table for selecting the number of bits in said first portion of said k bits.

5. The system of claim 1, further comprising:
an interface circuit between said image sensor and said data memory, said interface circuit preventing writing of said pixel data at a first location in said data memory when a pixel codeword stored at said first location indicates a reserved codeword.

6. The system of claim 5, wherein said reserved codeword comprises a defective pixel reserved codeword.

7. The system of claim 6, wherein when said lookup table is indexed by said defective pixel reserved codeword, said lookup table provides an LUT codeword instructing said processing unit to provide defective pixel correction.

8. The system of claim 5, wherein said reserved codeword comprises a masked pixel reserved codeword.

9. The system of claim 8, wherein when said lookup table is indexed by said masked pixel reserved codeword, said lookup table provides a LUT codeword instructing said processing unit to implement privacy mask processing function.

10. The system of claim 1, wherein said image processing functions performed by said processing unit comprises selection of one of a plurality of analog-to-digital conversion schemes for interpreting said pixel data.

11. The system of claim 1, wherein said image processing functions performed by said processing unit comprises an image processing algorithm for performing dark signal subtraction.

12. The system of claim 1, wherein each of said pixel elements of said image sensor generates analog signals representative of said image, and said image sensor further comprises an analog-to-digital converter for converting said analog signals to digital data as said pixel data.

13. The system of claim 1, wherein said image sensor comprises a two-dimensional sensor array of digital pixels, each of said digital pixels outputting digital signals as said pixel data.

14. A system-on-chip imaging system, comprising:
an image sensor comprising a two-dimensional array of pixel elements, said image sensor providing pixel data representing an image of a scene;
a data memory, in communication with said image sensor, for storing a first set of pixel codewords, at least some of said pixel codewords being indicative of said pixel data;
a first programmable lookup table, in communication with said data memory, for providing a first set of LUT codewords as output data when said first lookup table is indexed by said first set of pixel codewords;
a first processing unit, in communication with said data memory and said first lookup table, being operated to perform a first set of image processing functions in response to said first set of LUT codewords and providing output data in the form of a second set of pixel codewords;
an interface circuit, in communication with said first processing unit, for receiving said second set of pixel codewords;
a frame buffer, in communication with said interface circuit, for storing said second set of pixel codewords;
a second programmable lookup table, in communication with said frame buffer, for providing a second set of LUT codewords as output data when said second lookup table is indexed by said second set of pixel codewords; and
a second processing unit, in communication with said frame buffer and said second lookup table, being operated to perform a second set of image processing functions in response to said second set of LUT codewords and generating output image data.

15. The system of claim 14, wherein each of said pixel elements of said image sensor generates analog signals representative of said image, and said image sensor further comprises an analog-to-digital converter for converting said analog signals to digital data as said pixel data.

16. The system of claim 14, wherein said image sensor comprises a two-dimensional sensor array of digital pixels, each of said digital pixels outputting digital signals as said pixel data.

17. The system of claim 14, wherein said first set of pixel codewords are expressed in k bits and said first lookup table comprises $2^t$ entries where t is less than k.

18. The system of claim 14, wherein said data memory provides k bits for each pixel location, a first portion of said k bits being used to store CDS subtract values for each pixel location and a second portion of said k bits being used to store a pixel codeword for the respective pixel location.

19. The system of claim 18, wherein said processing unit programs said first lookup table for selecting the number of bits in said first portion of said k bits.

20. The system of claim 14, further comprising:
a second interface circuit between said interface circuit and said frame buffer, said second interface circuit preventing writing of said second set of pixel codewords at a respective location in said frame buffer when a pixel codeword stored at said location indicates a reserved codeword.

21. The system of claim 20, wherein said reserved codeword comprises a defective pixel reserved codeword.

22. The system of claim 20, wherein said reserved codeword comprises a masked pixel reserved codeword.

23. The system of claim 14, wherein said second set of image processing functions performed by said second processing unit comprises selection of one of a plurality of analog-to-digital conversion schemes for interpreting said pixel data.

24. The system of claim 14, wherein said second set of image processing functions performed by said second processing unit comprises an image processing algorithm for performing dark signal subtraction.

* * * * *